May 24, 1960     J. F. HILL ET AL     2,937,893
RESEALABLE CONDUIT COUPLING WITH ABUTTING
RESILIENT FLANGE SURFACES

Filed June 1, 1956     3 Sheets-Sheet 1

JOSEPH F. HILL
RICHARD G. SCHUMANN
JOHN R. DENISE
MAURICE S. DECKER, JR.
         INVENTORS.
BY
     Charles S. Haughey
           ATTORNEY

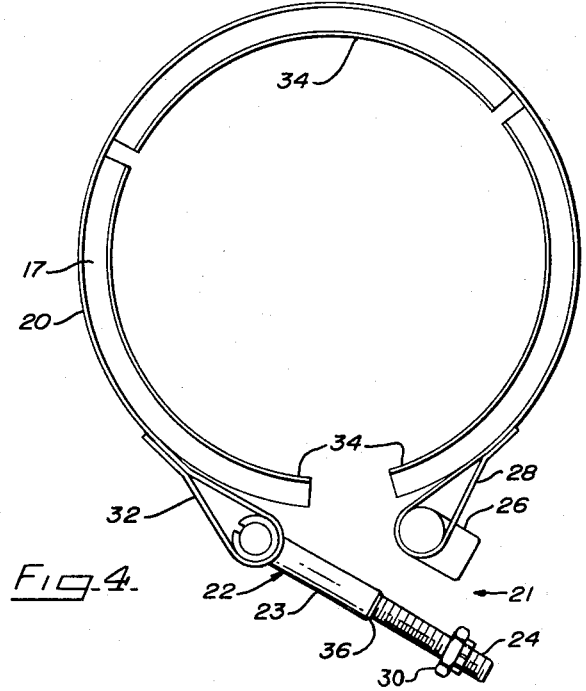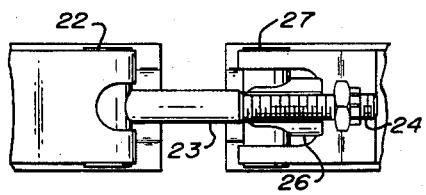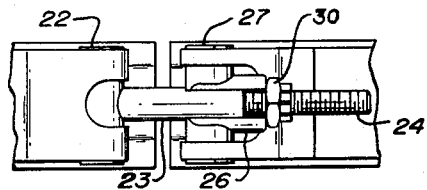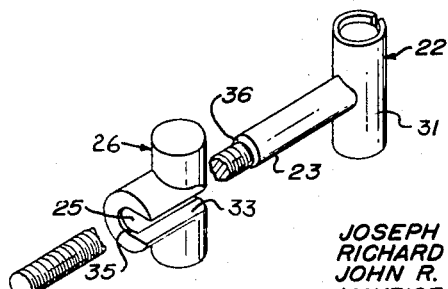
JOSEPH F. HILL
RICHARD G. SCHUMANN
JOHN R. DENISE
MAURICE S. DECKER, JR.
INVENTORS.
BY Charles S. Haughey
ATTORNEY May 24, 1960  J. F. HILL ET AL  2,937,893
RESEALABLE CONDUIT COUPLING WITH ABUTTING
RESILIENT FLANGE SURFACES Filed June 1, 1956   3 Sheets-Sheet 3

JOSEPH F. HILL
RICHARD G. SCHUMANN
JOHN R. DENISE
MAURICE S. DECKER, JR.
        INVENTORS.

BY
*Charles S Haughey*
          ATTORNEY

United States Patent Office 2,937,893
Patented May 24, 1960

2,937,893

RESEALABLE CONDUIT COUPLING WITH ABUTTING RESILIENT FLANGE SURFACES

Joseph F. Hill, Richard G. Schumann, John R. Denise, and Maurice S. Decker, Jr., all of Columbus, Ohio, assignors, by mesne assignments, to Midland-Ross Corporation, Cleveland, Ohio, a corporation of Ohio Filed June 1, 1956, Ser. No. 588,821

4 Claims. (Cl. 285—328)

This invention relates generally to conduit couplings and more particularly to tube connectors for jet aircraft tubing wherein high temperatures and pressures pose a problem.

This invention is directed to an improved conduit coupling, the principal advantages of which are simplicity, provision of a metallic seal whereby the pressure within the conduit is utilized to help effect the seal, and ease of assembly and disassembly. This last advantage is of particular importance in aircraft where space is limited and frequent servicing of equipment is necessary. In the event of failure of any the components of which the conduit interconnects it is desirable to replace the defective components with a minimum effort and in a minimum time.

The principal object of this invention is to provide a novel and improved conduit coupling and flange construction whereby the flanges are resiliently forced together, providing an efficient pressure gas seal, and which can be assembled with the greatest of ease and reassembled with no gasket problem and no loss of sealing efficiency.

Toward the attainment of the foregoing object, the invention contemplates a pressure coupling embodying the combination of a pair of annular beaded flanges having opposed resilient annular faces adapted to be subjected to axial pressure such as to force and deflect the opposed faces into sealing engagement and establish a gas tight seal and also adapted to subject the surfaces of the flanges reverse of the opposing faces to the internal pressure of the conduit; together with an actuator ring for exerting axial and radial pressure against the flanges, the actuator ring embodying a segmentary band with a substantially frusto-conical cross-section and a constrictor band for applying radial compression.

Prior devices which utilized opposed flange faces to effect a seal have had the internal pressure of the conduit exerted against the contacting faces of the flanges in such a manner as to tend to spread the juncture of the contacting faces, and to place external ambient pressure on the reverse flange faces, thereby limiting the pressure which could be applied without producing leakage. The conduit coupling of the instant invention is provided with flanges junctured in a manner so that the internal pressure tends to force the flanges together thereby tending to increase the effectiveness of the seal.

In conduit couplings designed for use with jet engine bleed-air systems, determined from a survey of several aircraft companies, it is desirable to limit leakage to a maximum rate of 0.01 c.f.m. of standard air per inch of duct diameter. Tests conducted on the coupling design of the invention indicate that such allowable leakage will not be exceeded in such devices.

For a consideration of what we believe to be novel and our invention, attention is directed to the following description taken in connection with the accompanying drawings in which like characters are used to designate the same or similar parts throughout the several figures of the drawing:

Figure 4 is a plan view of the actuator ring;

Figure 5 is a front view of the take-up and latching mechanism of the actuator ring in the open position showing only a portion of the ring so as to show relationship of parts;

Figure 6 is a view similar to Figure 5 but in a closed position;

Figure 7 is a perspective view of the T-bolt and T-trunnion of the take-up and latching mechanism;

Figure 1:
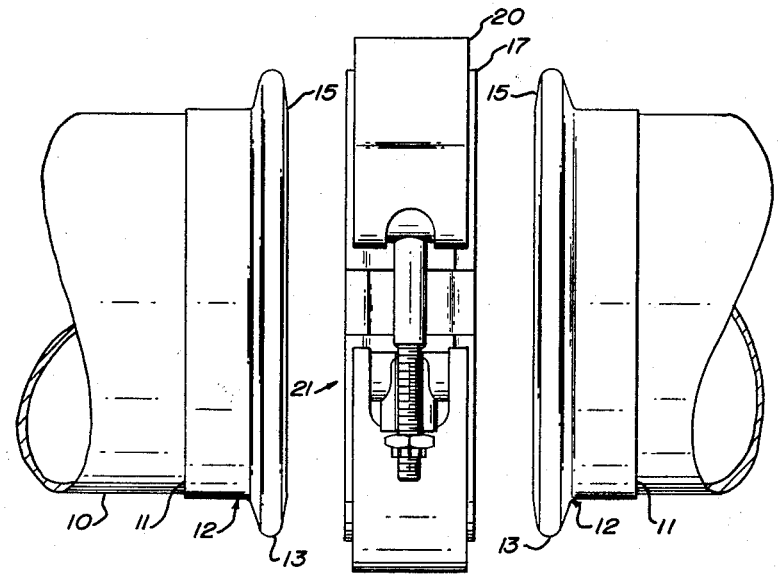
Figure 1 is a side elevational view of the disassembled conduit coupling of the invention, shown in connection with the ends of a pair of tubes.
Figure 2:
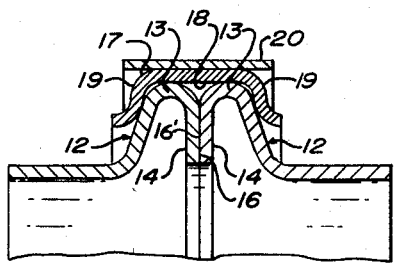
Figure 2 is an enlarged fragmentary side elevation view of the conduit coupling assembly, shown in section to amplify the seal construction.

The tubular conduits 10 are joined by welding or any other suitable means to the collars 11 of flange members 12. These flange members are annular and are provided with annular bead portions 13 at the outer extremity of the flange section. Extending radially inward and axially outward from the beaded portion are annular flat portions 15 which provide abutting end surfaces 16 and 16' adapted to make sealing engagement with each other upon coupling.

Figure 3:
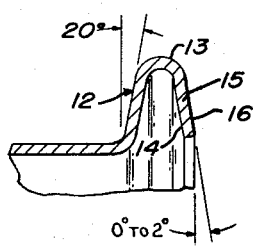
Figure 3 is an enlarged fragmentary view of the beaded portion of an annular flange.

In a coupling designed for use with jet engine bleed-air systems it has been found desirable to extend the flange obliquely outward at an angle to the order of 20° from the vertical line, as indicated in Figure 3 and invertly roll the flange to present the flat surface 16 at a preferred angle of approximately 1° from the vertical. "The vertical" in this case denotes lines perpendicular to the axis of the tube. In such systems the flat surfaces 16 may divert from the vertical at an angle within the range of 0° to 2° and yet maintain an effective seal. In other systems these surfaces may diverge at any angle which upon being subjected to axial pressure will deflect into sealing engagement.

The segmented actuator ring 17 is a channeled annulus of frusto-conical section with periphery 18 and side walls 19 which upon moving radially inward will exert a wedging action against the annular beads 13 forcing them axially toward each other and into axial alignment. By obtaining substantially a line contact on the annular beads, a wedging action is obtained forcing opposed surfaces 16 and 16' together.

Actuator ring 17 is subjected to radial compressive forces through the action of the constrictor band 20 the ends of which are joined by a take-up and latching mechanism 21. The take-up mechanism 21 may comprise the form as described in a co-pending application of M. S. Decker, Jr., also assigned to the present assignee, or any other conventional form. Such take-up mechanism may comprise a T-bolt 22 with shank 23 and stepped-down threaded end 24 extending through the bore 25 of a T-trunnion 26 having trunnion elements 27 journaled in the respective portions of a bifurcated loop 28 formed by doubling-back the end of the constrictor band 20, a nut 30 threaded onto the threaded end 24 of bolt 22 and the T-head 31 of bolt 22 journaled in the other bifurcated looped end 32 of constrictor band 20.

To couple the tube sections 10, the actuator ring 17 is fitted over flanges 12, the constrictor band 20 being flexible enough to spread the segments of the actuator ring 17 sufficiently to receive the flanges 12. The take-up mechanism 21 is then activated by inserting the stepped-down threaded end 24 of bolt 22 through the slot 33 of T-trunnion 26. By advancing nut 30, the non-threaded or stepped-up portion of shank 23 will be drawn into the bore 25 developing tension in constrictor band 20 to draw the segments 34 radially inward, the side walls 19 of ring 17 thereby exerting a wedging action against annular beads 13 to force them axially toward each other and into axial alignment and, at the same time, subject the flat flange portions 15 to intimate contact with each other.

The relationship of the coacting elements of the coupling are such that upon tightening of the constricting band and concomitant wedging action of the actuator ring 17 the annular beads 13 may just barely seat on the inside periphery 18 of said actuator ring. This arrangement not only provides a means for aligning the conduit sections but prevents overtightening of the flanges 16 to the extent of disrupting the seal therebetween. After the beads 13 seat upon the actuator ring inside periphery 18 any further tightening would necessarily have to be of a magnitude sufficient to deform the beaded flanges. The rolled construction of the flanges gives them tremendous strength and it is very unlikely that such beaded or rolled flanges would be deformed in normal operation.

As a further precaution against overtightening and disruption of the seal, the bore 25 of T-trunnion member 26 may be provided with an internal shoulder 35 to abutably engage shoulder 36 of T-bolt shank 23 and function as a stop or limit. Such shoulder 35 also serves to increase the end face of T-trunnion 26 for nut 30 to bear against upon tightening.

Prior to being subjected to contact and concomitant deflection, flange faces 16 and 16' extend slightly (approximately 1°) from a vertical position as can be seen in Fig. 3. As the beads 13 are subjected to axial pressures imparted by the actuator ring 17, the flange faces 16 and 16' will be compressed and deflected to a substantially vertical position establishing a circular plane of sealing engagement thereby.

At low pressures the actuator ring exerts sufficient compression to maintain a seal between the opposing flange faces 16. As the internal conduit pressure is increased the flange faces are forced together to effect a tighter seal. The particular flange construction of the invention exposes the back faces 14 of the flange portions 15 to the internal pressure of the conduit which is manifested by equal and opposite forces tending to force the faces 16 together and resist spreading.

The resistance to spreading of the juncture formed by the contacting faces is further increased by employing a segmented actuator ring 17 of frusto-conical section with a relatively low sidewall 19 which maintains the line of engagement of the actuator ring high upon the flanges, virtually on the bead portions 13. In such an arrangement the ratio of the length of sidewall to the thickness of material is so great that it becomes difficult to flex the side walls of the actuator ring. Therefore, the flange portions 15 must necessarily flex and force the faces 16 into sealing engagement.

The efficiency of the seal depends upon the intimacy of contact established between the flange faces 16 and 16' and the various influences, such as high temperatures and pressures, to which the seal is subjected. To meet the exacting requirements of the aircraft companies for a coupling for use with jet engine bleed-air systems which will withstand the high temperatures and pressures the flange faces are polished to obtain accurate configuration of said flange faces and to establish a series of concentric circular polish lines with a finish within the range of 10 to 25 microinches. Where the leakage limitations and service conditions are less stringent it has been found that an effective seal may be maintained by establishing a series of concentric polish lines within the range of 5 to 40 microinches.

Figure 8:
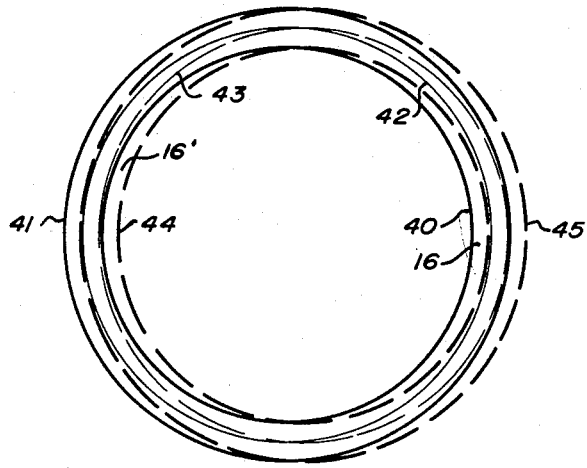
Figure 8 is a schematic diagram showing one flange face superimposed upon the opposite and abutting flange face.

To obtain the sealing advantage of the concentric circular polish lines where identical annular end faces 16 are employed, as a minimum, it is essential that at least one half of the width of each matching face be in engagement with the opposite face. Theoretically this proportion would yield a single circle on each face that would be completely contacted by the opposite face as is schematically represented in Fig. 8. It has been found that when there is a "runout" of all polish lines, out of contact with the opposite polished face, there is a likelihood of gas leakage. The effectiveness of the seal is usually proportioned to the area of contact in which there is no runout of polish lines. One face 16 is represented by the area circumposed by the inside circumference 40 and outside circumference 41 and has a continuously contacted polish line 42 while the opposite face 16' (indicated by broken lines) is represented by the area circumposed by the inside circumference 44 and outside circumference 45 and has a continuously contacted polish line 43.

Figure 9:
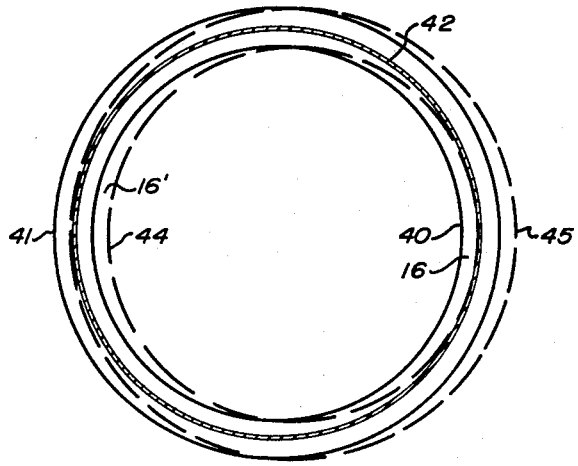
Figure 9 is a view similar to Figure 8 but with a different degree of superimposition.

However, in practice and as schematically shown in Fig. 9, it has been found desirable to maintain as a minimum, 10% of the polished surface area or concentric circles 42 of one face 16 in full contact with the opposite face 16'. To avoid confusion the contacted area 43 of face 16' is not shown in Fig. 9 but would be of the same order and opposite hand of the area 42 of face 16.

Figure 10:
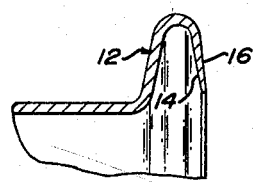
Figure 10 is an enlarged fragmentary view of an alternate beaded flange construction.

The establishment of intimacy of contact is further facilitated in some instances by an alternate design of the flange members 15. As can be seen in Fig. 10, the flange members 15 are provided with a wall thickness of progressively decreasing dimension from the collar portion 11 to the flange faces 16. The wall thicknesses are so related as to permit flexure where required, at the flange faces 16 but yet maintain rigidity where required, at the collar portions 11.

We claim:

1. A conduit coupling suitable for use with high temperature, high pressure fluids on aircraft, comprising in combination: a pair of axially opposed flanges each including a collar portion, radially projected beaded rims joined to said collars by outwardly extending conical land converging toward each other and having inwardly extending flange face portions the opposed and adjacent surfaces of which are substantially flat but slightly conical and converging toward each other to initially contact each other at the smaller diameters thereof, said flanges being resilient to deflect said flange face portions under axial compression of said flanges to produce a substantial annular area of contact, both of said flange face portions having circular polish lines at the contacting area thereof; and constricting band means for compressing said flanges axially into sealing contact with each other, said means having contact portions for contacting said conical land portions and having bridge portions spaced outwardly of said rims extending between said contact portions and of an axial length to contact said beaded rims upon constriction thereof simultaneously with deflection of said face portions into said area contact to maintain alignment of said flanges and to prevent overtightening of the constricting band means.

2. A conduit coupling according to claim 1 wherein the flanges are of decreasing thickness on the inwardly extending flange face portions.

3. A conduit coupling according to claim 1 wherein the face portions of the flanges are angled from said perpendicular plane at an angle within the range of 0° to 2°.

4. A conduit coupling according to claim 1 wherein said polish lines are of a depth of between 5 and 40 microinches.

References Cited in the file of this patent

UNITED STATES PATENTS

| | | |
|---|---|---|
| 1,097,798 | Girod | May 26, 1914 |
| 1,857,297 | Faulkner | May 10, 1932 |
| 1,935,673 | Smith | Nov. 21, 1933 |
| 2,136,036 | Avery | Nov. 8, 1938 |
| 2,329,369 | Haver | Sept. 14, 1943 |
| 2,519,847 | Neely | Aug. 22, 1950 |
| 2,674,471 | Hawkins | Apr. 6, 1954 |
| 2,689,141 | Kiekhaefer | Sept. 14, 1954 |
| 2,717,788 | Raynes | Sept. 13, 1955 |
| 2,761,707 | Herman | Sept. 4, 1956 |
| 2,781,205 | Lane | Feb. 12, 1957 |

FOREIGN PATENTS

| | | |
|---|---|---|
| 284,776 | Great Britain | Feb. 13, 1928 |
| 150,418 | Sweden | June 21, 1955 |

OTHER REFERENCES

Swigert: "The Story of Superfinish," Lynn Publishing Co., 1940 (pages 151, 278).